United States Patent
Kirla

(10) Patent No.: US 7,392,052 B2
(45) Date of Patent: Jun. 24, 2008

(54) HARD HANDOVER METHOD AND CONTROLLER

(75) Inventor: Olli Kirla, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/707,864

(22) Filed: Feb. 20, 2007

(65) Prior Publication Data

US 2007/0167164 A1 Jul. 19, 2007

Related U.S. Application Data

(63) Continuation of application No. 10/836,619, filed on May 3, 2004, now Pat. No. 7,197,307.

(30) Foreign Application Priority Data

Feb. 27, 2004 (FI) .................................. 20040313

(51) Int. Cl.
*H04Q 7/20* (2006.01)
(52) U.S. Cl. .................. 455/436; 455/437; 455/438; 455/439; 455/442; 455/443; 455/444; 455/560; 370/331
(58) Field of Classification Search ................. 455/436, 455/437, 438, 439, 440, 442, 444, 450, 452.1, 455/452.2, 561; 370/328, 329, 330, 331, 370/332, 333
See application file for complete search history.

(56) References Cited

U.S. PATENT DOCUMENTS

| 5,711,003 | A  | * | 1/1998 | Dupuy | 455/436 |
| 6,078,813 | A  | * | 6/2000 | Ljung | 455/436 |
| 6,122,512 | A  | * | 9/2000 | Bodin | 455/440 |
| 6,393,003 | B1 | * | 5/2002 | Lee | 370/331 |
| 6,628,631 | B1 | * | 9/2003 | Mazawa et al. | 370/331 |
| 6,628,632 | B1 | * | 9/2003 | Dolan | 370/332 |
| 6,973,111 | B2 |   | 12/2005 | Yamashita et al. | |
| 7,043,244 | B1 | * | 5/2006 | Fauconnier | 455/442 |
| 7,197,019 | B2 | * | 3/2007 | Menzel et al. | 370/331 |
| 7,197,307 | B2 | * | 3/2007 | Kirla | 455/436 |
| 2004/0082330 | A1 | * | 4/2004 | Marin | 455/438 |
| 2005/0068967 | A1 | * | 3/2005 | Terry et al. | 370/395.52 |

FOREIGN PATENT DOCUMENTS

WO WO 01/24558 A1 4/2001
WO WO 01/58086 A2 8/2001

* cited by examiner

*Primary Examiner*—Joseph Feild
*Assistant Examiner*—Olumide Ajibade-Akonai
(74) *Attorney, Agent, or Firm*—Squire, Sanders & Dempsey, L.L.P.

(57) ABSTRACT

The invention is related to a controller of a communication system that includes a module for exchanging messages indicating a traffic channel change between communication system units before hard handover, a module for changing a downlink traffic channel, a module for detecting a communication system unit on a handover target channel, a module for changing an uplink traffic channel, and a module for completing a hard handover process.

6 Claims, 9 Drawing Sheets

HARD HANDOVER METHOD AND CONTROLLER

REFERENCE TO RELATED APPLICATIONS

This is a Continuation of application Ser. No. 10/836,619, filed May 3, 2004. The disclosure of the prior application is hereby incorporated herein.

FIELD OF THE INVENTION

The invention relates to a hard handover method and a controller of a communication system.

BACKGROUND

The handover (or handoff) procedure is a means to continue a call when a user terminal crosses the border of one cell to another. In a cellular network, a cell typically has several neighbouring cells. The basic concept of handover is that when a user terminal moves from the coverage area of one cell to another, a new connection to the target cell is set up and the connection to the old cell may be released.

In hard handovers, the main problem is the downlink user data interruption time caused by delays in signalling messages and a round-trip delay between the terminal and physical channel-switching device on the network side.

BRIEF DESCRIPTION

According to an aspect of the invention, there is provided a hard handover method in a communication system, comprising: exchanging messages indicating bidirectional traffic channel change between communication system units before hard handover, changing the bidirectional traffic channel before the detection of a communication system unit on a handover target channel.

According to an aspect of the invention, there is provided a hard handover method in a communication system, comprising: exchanging messages indicating traffic channel change between communication system units before hard handover, changing a downlink traffic channel, detecting a communication system unit on a handover target channel, changing an uplink traffic channel, completing a hard handover process.

According to an aspect of the invention, there is provided a controller of a communication system, comprising: means for exchanging messages indicating bidirectional traffic channel change between other communication system units before hard handover, means for changing the bi-directional traffic channel before the detection of a communication system unit on a handover target channel.

According to another aspect of the invention, there is provided a controller of a communication system, comprising: means for exchanging messages indicating traffic channel change between communication system units before hard handover, means for changing a downlink traffic channel, means for detecting a communication system unit on a handover target channel, means for changing an uplink traffic channel, means for completing a hard handover process.

Embodiments of the invention are described in the dependent claims.

The method and system of the invention provide several advantages. In an embodiment, a downlink user traffic interruption time is reduced.

LIST OF DRAWINGS

Figure 1:
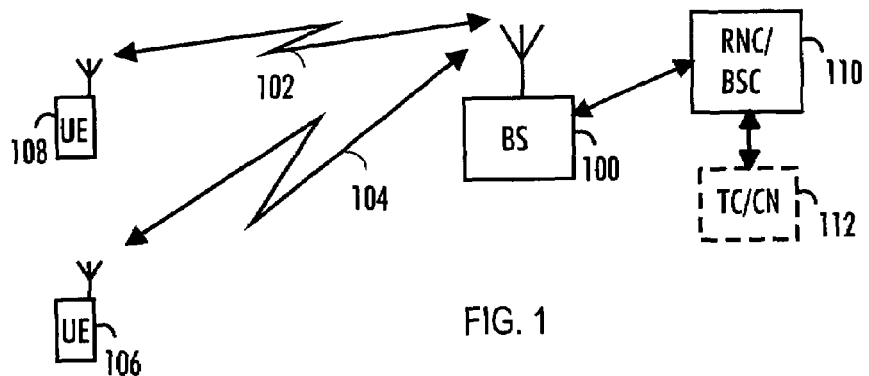
Figure 10:
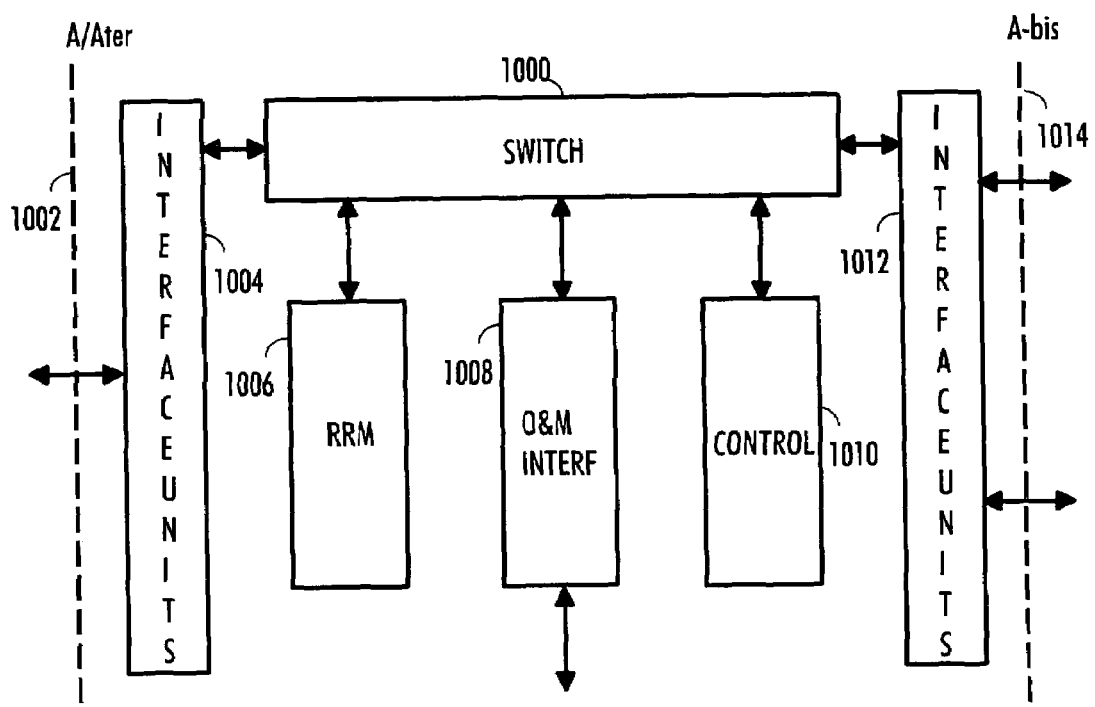
Figure 2:
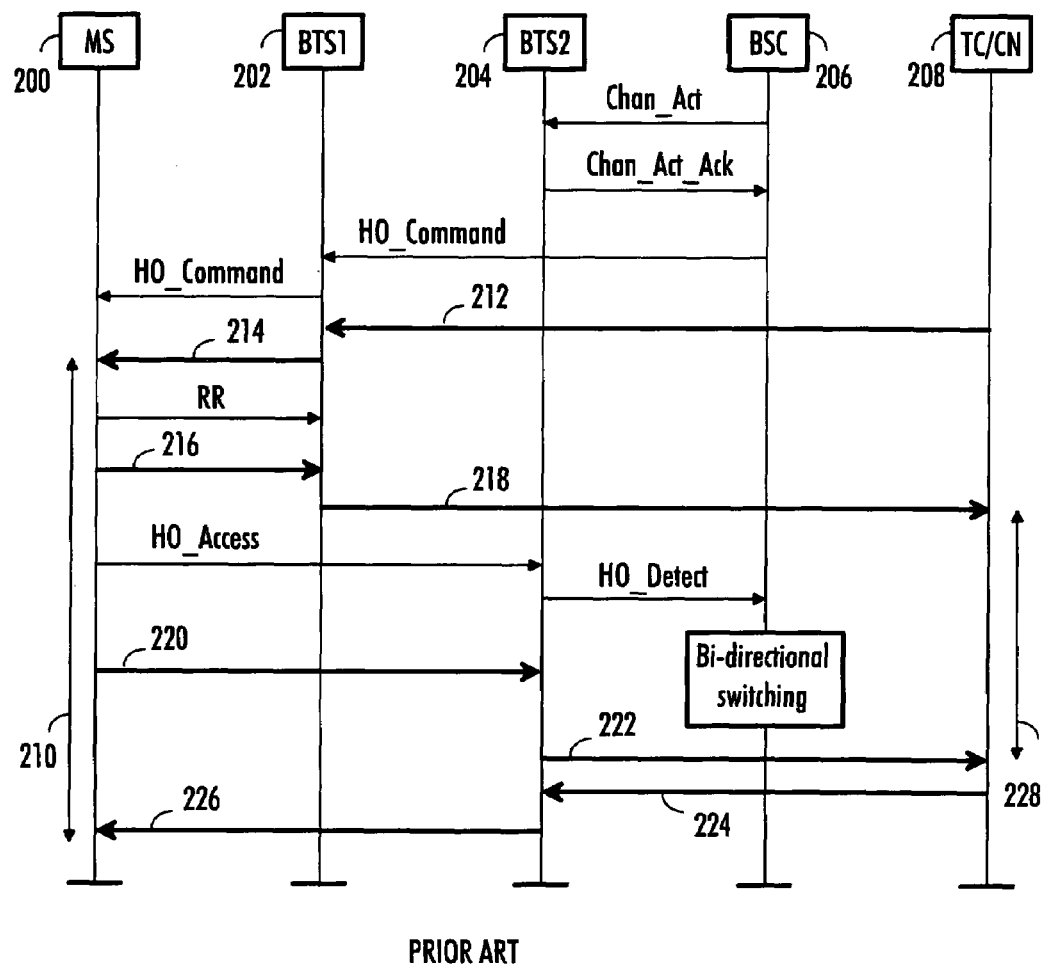
Figure 3:
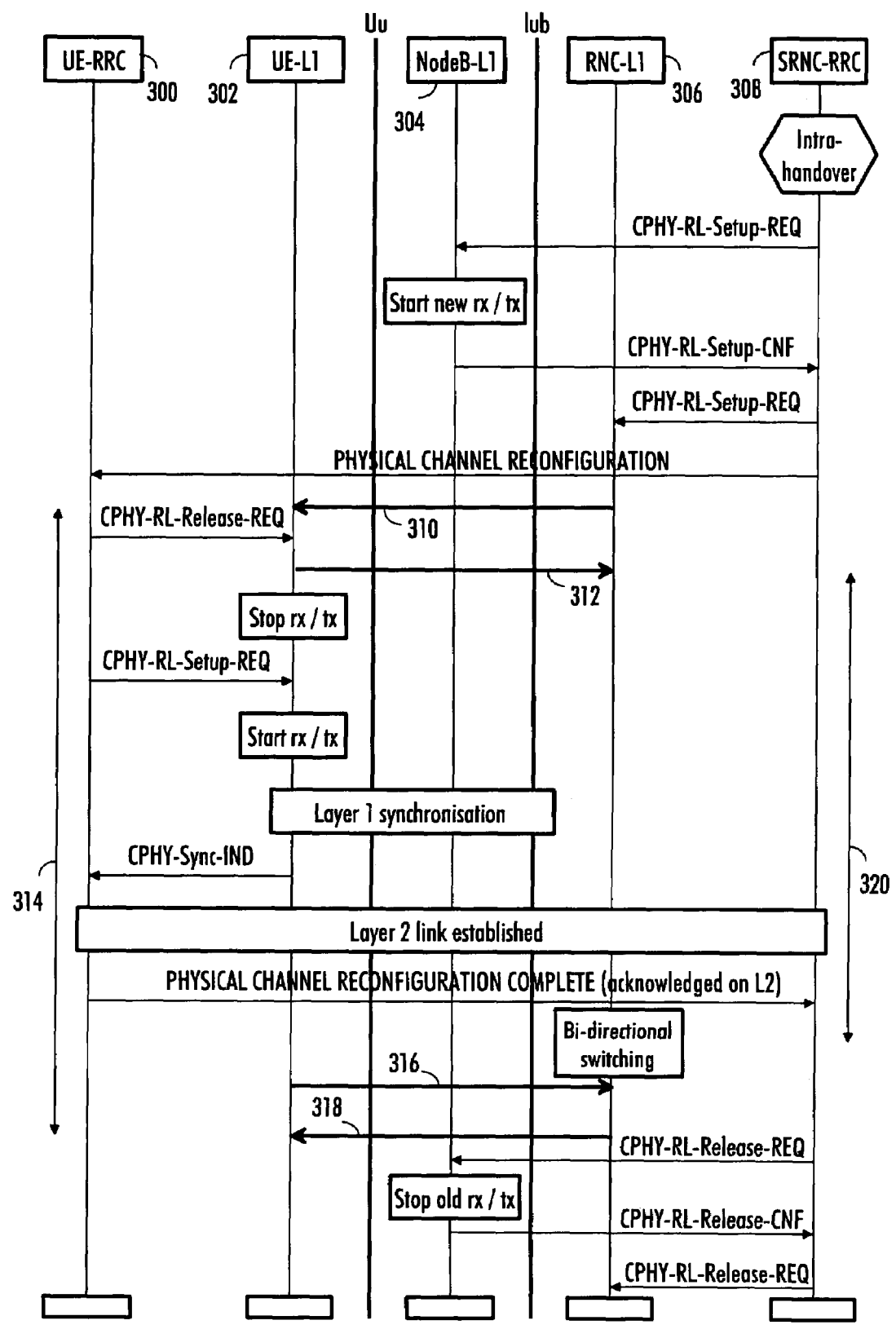
Figure 4:
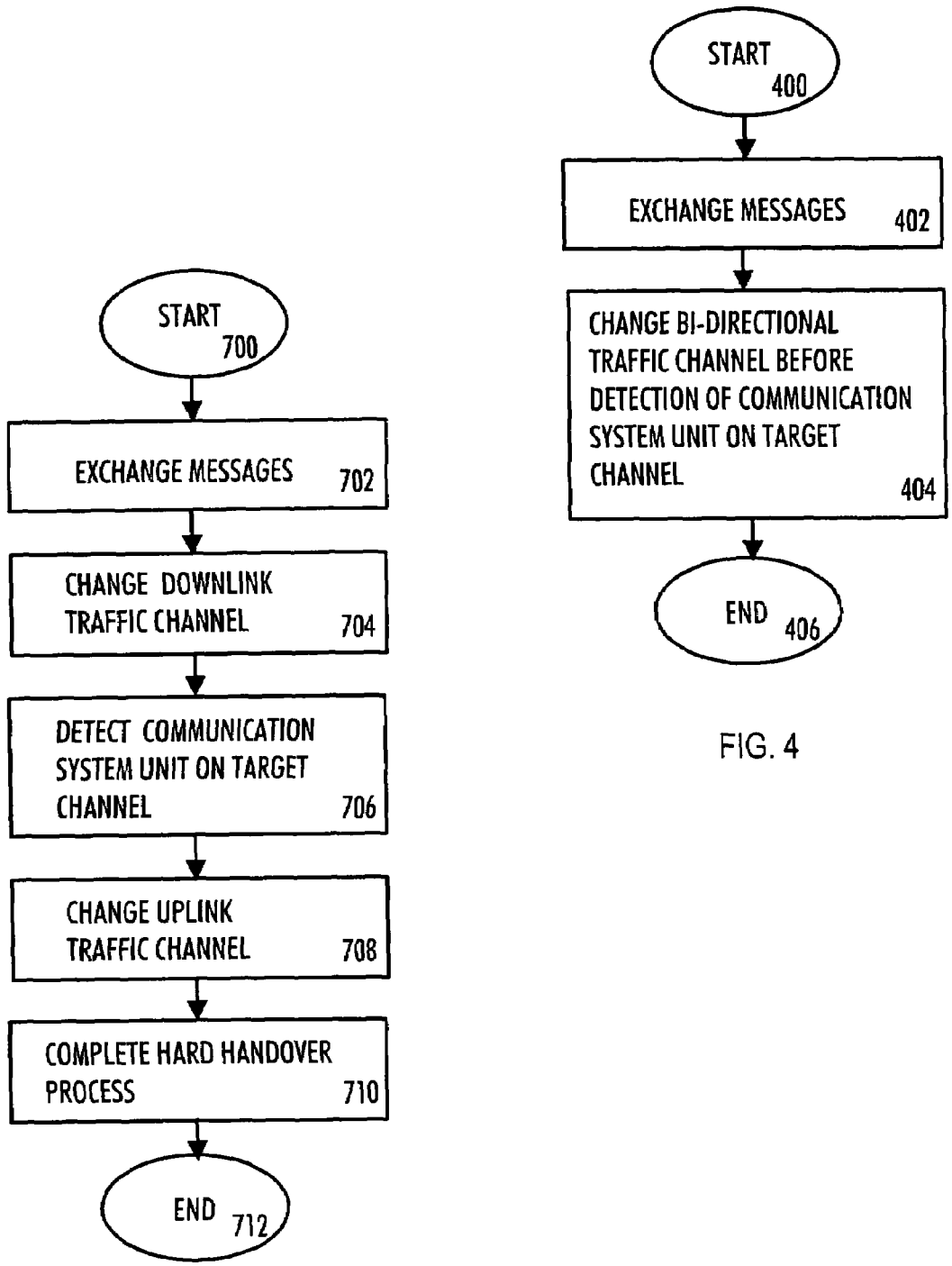
Figure 5:
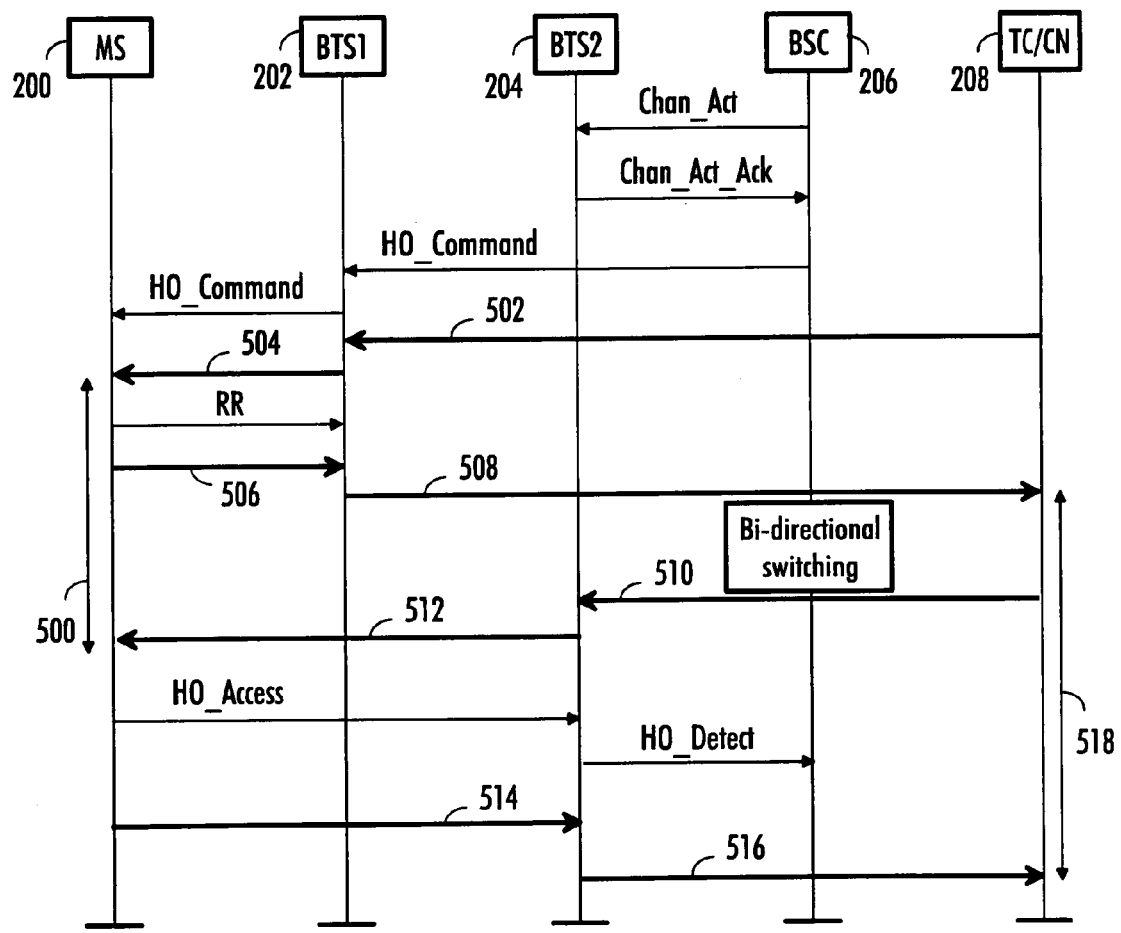
Figure 6:
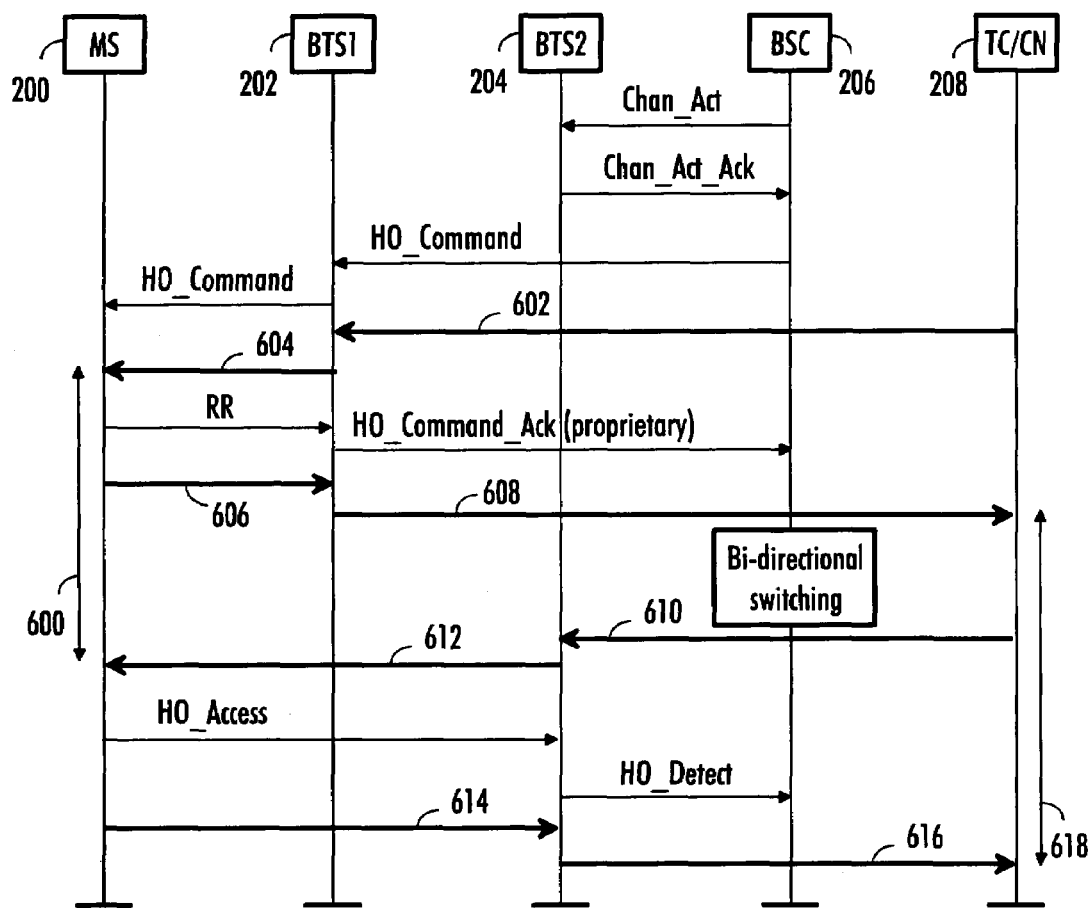
Figure 8:
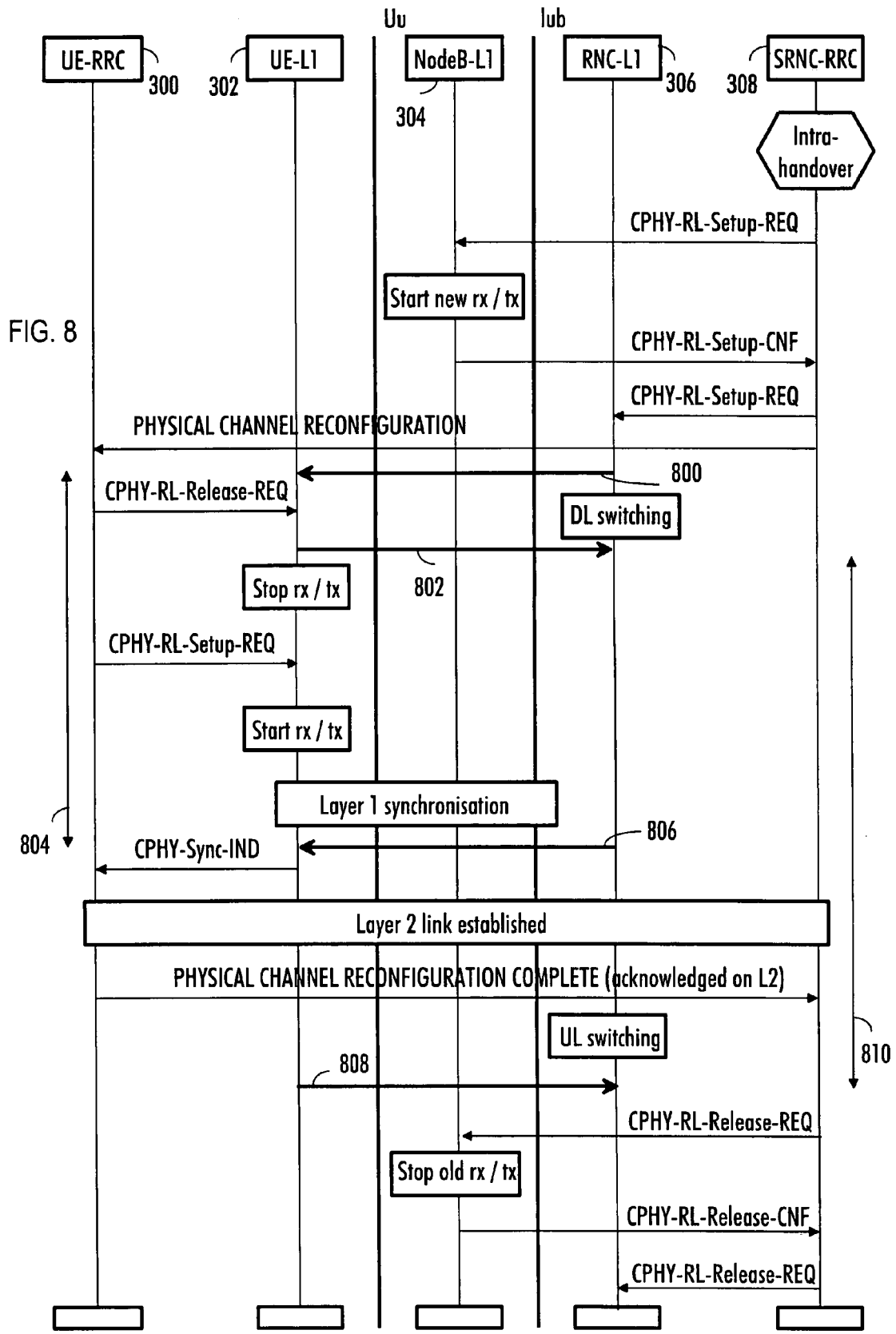
Figure 9:
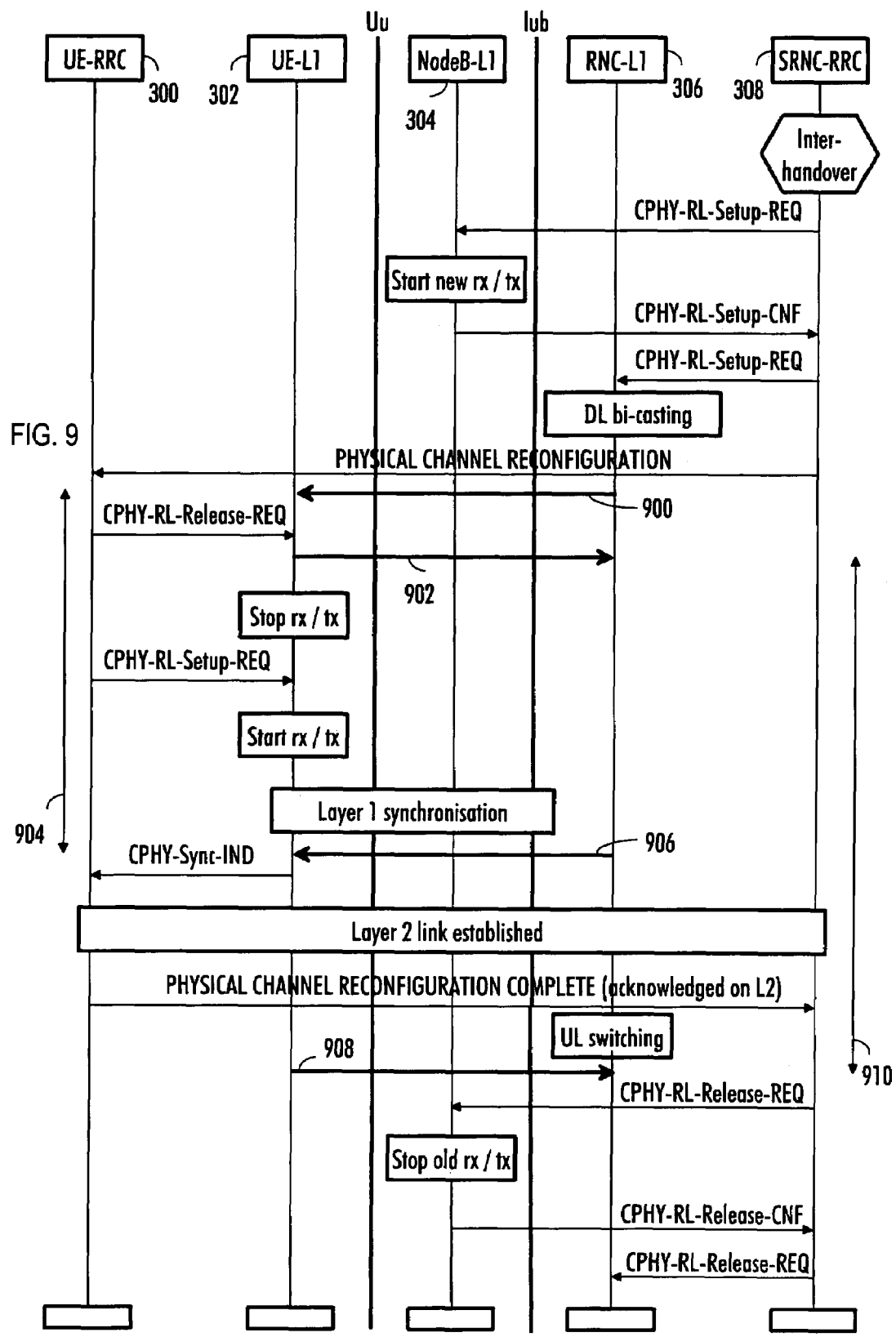
Figure 11:
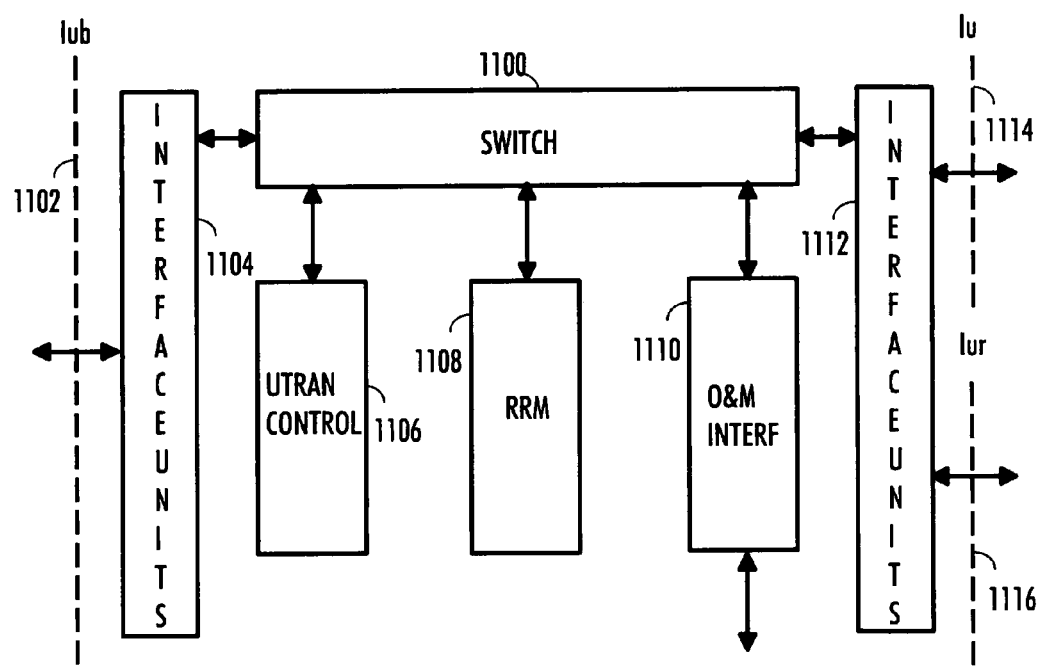

In the following, the invention will be described in greater detail with reference to the preferred embodiments and the accompanying drawings, in which FIG. 1 shows an example of a communication system, FIG. 2 illustrates prior art hard handover of the GSM system, FIG. 3 illustrates prior art handover of the UMTS system, FIG. 4 is a flow chart, FIG. 5 illustrates one embodiment of a hard handover method according to the invention, FIG. 6 illustrates one embodiment of a hard handover method according to the invention, FIG. 7 is a flow chart, FIG. 8 illustrates one embodiment of a hard handover method according to the invention, FIG. 9 illustrates one embodiment of a hard handover method according to the invention, FIG. 10 is a block diagram illustrating an example of a logical structure of a base station controller, FIG. 11 is a block diagram illustrating an example of a logical structure of a radio network controller.

DESCRIPTION OF EMBODIMENTS

An example of a communication system in which the preferred embodiments of the invention can be applied is examined with reference to FIG. 1. The present invention can be applied in various wireless communication systems. One example of such a communication system is UMTS (Universal Mobile Telecommunications System) radio access network. It is a radio access network, which includes WCDMA (wideband code division multiple access) technology and can also offer real-time circuit and packet switched services. Another example is GSM (Global System for Mobile Communications). The embodiments are not, however, restricted to the systems given as examples but a person skilled in the art may apply the solution in other radio systems provided with the necessary properties.

It is clear to a person skilled in the art that the method according to the invention can be applied to systems utilizing different modulation methods or air interface standards.

FIG. 1 is a simplified illustration of a digital data transmission system to which the solution according to the invention is applicable. This is a part of a cellular radio system, which comprises a base station (or a node B) 100 having bidirectional radio links 102 and 104 to subscriber terminals 106 and 108. The subscriber terminals may be fixed, vehicle-mounted or portable. The base station includes transceivers, for instance. From the transceivers of the base station there is a connection to an antenna unit, which establishes the bi-directional radio links to the subscriber terminal. The base station is further connected to a controller 110, radio network controller (RNC) or base station controller (BSC), which transmits the connections of the terminals to other parts of the network. The base station controller controls in a centralized manner several base stations connected to it. The base station controller or the radio network controller is further connected to a core network 110 (CN). Depending on the system, the counterpart on CN side can be a mobile services switching centre (MSC), a media gateway (MGW) or a serving GPRS (general packet radio service) support node (SGSN). In some systems, there is also a transcoder TC 112, which converts signals into different modes, for example from 30 GSM-type 16 kbit sub-rate channels into 30 64 kbit PCM (Pulse Code Modulation) channels.

The cellular radio system can also communicate with other networks such as a public switched telephone network or the Internet.

The handover (or handoff) procedure is a means to continue a call when a user terminal crosses the border of one cell to another. In a cellular network, a cell typically has several neighbouring cells. The basic concept of handover is that when the user terminal moves from the coverage area of one cell to another, a new connection to the target cell is set up and the connection to the old cell is released.

In WCDMA systems (Wide Band Code Division Multiple Access), like UMTS (Universal Mobile Telecommunication System), there are several different types of hard handovers, such as Intra-frequency handovers, Inter-frequency handovers and inter-system handovers. For performing a successful handover, the user terminal has to perform measurements to find out whether the signal of a base station (or node B) to which it is connected is strong enough or whether possibly a stronger signal exists in another cell.

Another type of handovers is also known, called soft handover. In soft handover, a mobile station is connected to more than one base station simultaneously. Softer handover is soft handover between two sectors of a cell.

In GSM (Global System for Mobile Communications) systems, the user terminal monitors preferably continuously the neighbouring cell's power levels. The base station gives the user terminal a list (sometimes called an active set) of base stations (channels) on which to perform power measurements. The measurement results and the quality reports are sent back to the base station of the current cell of the user terminal. The base station can also perform measurements.

There are many reasons for handover. The basic reason behind handover is that an air interface connection no longer fulfils the criteria set for it. The most typical criteria for handover are, for instance, signal quality, user mobility and traffic distribution.

Signal quality handover is made when the quality of the radio signal deteriorates below the parameters defined in the radio network control ler. The deterioration is detected by the signal measurements carried out by mobile stations or base stations.

Traffic distribution handover occurs when the traffic capacity of a cell has reached the maximum or is approaching it. In such a situation, a mobile station near the edge of a cell with a high load may be transferred to a neighbouring cell with a smaller load.

Let us examine hard handover processes of GSM and UMTS systems in greater detail by means of FIGS. 2 and 3. Layer-2/layer-3 signalling messages are marked with thin lines, and the last user data frame on an old traffic channel and the first user data frame on a new traffic channel are marked with bold lines. In the following examples, successful handover processes are described. It is also possible that handover is not succeeded. Then, typically, the user terminal returns to the old channel or the call is terminated.

Attention should be paid to the fact that the timing of the arrows depicting uplink or downlink user data may differ to some extent from what is depicted in the following examples due to the variations in the implementations of the user terminal or the network and its elements.

In FIG. 2, there is shown a prior art hard handover process of the GSM system. The system of FIG. 2, comprises a user terminal 200 (MS), a user terminal's current base station 202 (BTS1), a handover target base station 204 (BTS2), a base station controller 206 (BSC) and a transcoder 208 (TC).

The hard handover process starts with Channel Activation (Chan_Act) and Channel Activation Acknowledgement (Can_Act_Ack) messages, with which, information on a traffic channel is received in a target base station 204. Then, the base station controller 206 sends a Handover Command (HO_Command) to the current base station 202, which forwards it to the user terminal 200. Arrows 212 and 214 show when the last downlink data frame transmitted on the old channel is received by the user terminal. (Note: although the user terminal has left the old channel, the network sends data via the old BTS on the downlink until bidirectional switching is done.)

The user terminal indicates that it has received the message by sending an RR (Receive Ready) message. Then the user terminal lefts the current base station 202 and starts tuning to the handover target base station 204. The transcoder 208 is still encoding downlink data according to the channel format of the channel between the transcoder 208 and the base station 202 (BTS1).

Arrows 216 and 218 show when the last uplink data frames are transmitted on the old channel.

A bidirectional switching of a traffic channel in the BSC is carried out after a Handover Access (HO_Access) message is sent to the handover target base station 204 (BTS2) and a Handover Detection message (HO_Detect) is sent to the base station controller 206. After that, the transcoder TC 208 starts the downlink encoding with a new channel format. In hard handovers, the bi-directional speech path is changed after the user terminal has changed into a new channel, i.e. it has been detected in the target base station. In GSM systems, the speech path change is triggered in the base station controller upon reception of the received Handover Detection or Establish Indication (not shown in the Figure) message.

Arrows 220 and 222 show when the first uplink data frames are transmitted on the new channel, Arrows 224 and 226 show when the first downlink data frames are transmitted on the new channel.

Arrow 210 depicts the lost data on the downlink and arrow 228 the lost data on the uplink.

In FIG. 3, there is depicted as an example an intra-RNC hard handover procedure, which starts with a radio link set-up request primitive (CPHY-RL-Setup-REQ) from an SRNC-RRC (Radio Resource Control unit of the Serving Radio Network Controller) 308 over a Control Service Access Point (C-SAP) of the UMTS protocol to Node B 304. Node B 304 starts a new radio link for reception and transmission. This is called radio link addition.

Node B sends a radio link set-up confirm SAP (service Access Point) primitive (CPHY-RL-Setup-CNF) to the SRNC-RRC and after that the SRNC-RRC sends another SAP primitive (CPHY-RL-Setup-REQ) to an RNC-L1 306 and a physical channel reconfiguration message to the Radio Resource Control, RRC, of the user terminal 300.

Then the user terminal sends a radio link release request SAP primitive (CPHY-RL-Release-REQ) to a UE-L1 302. A physical channel is changed and the user terminal stops the old radio link for reception and transmission. The radio link stopping is called radio link removal.

Arrow 310 depicts when the last downlink data frame is received by the user terminal on the old traffic channel. Arrow 312 depicts when the last uplink data frame is transmitted on the old traffic channel.

The user terminal RRC (Radio Resource Controller) sends a radio link set-up request message (CPHY-RL-Setup-REQ) to the user terminal's L1 control and a new radio link for reception and transmission is established (radio link addition). Then, layer-1 (L1) synchronisation is made and a channel synchronisation indicator (CPHY-Sync-IND) SAP primitive is conveyed between the user terminal RRC and the L1 control.

Then a layer-2 (L2) link is established. A physical channel reconfiguration complete message is sent form the user terminal to the SRNC-RRC. A physical channel change is marked with a bidirectional switching block. The SRNC- RRC sends a radio link release request SAP primitive (CPHY-RL-Release-REQ) to Node-B which then stops the old radio link for reception and transmission. The radio link stopping is called radio link removal.

Arrow 316 depicts when the first uplink data frame is transmitted on the new traffic channel. Arrow 318 depicts when the first downlink data frame is transmitted on the new traffic channel.

Node-B sends the radio link release confirmation (CPHY-RL-Release-CNF) SAP primitive to the SRNC-RRC which then sends a radio link release request SAP primitive (CPHY-RL-Release-REQ) to the Node-B.

For hard handovers of a 3G system, the physical channel is changed on the Layer-1 of the RNC (Radio Network Controller), typically by Macro Diversity Combiner (MDC) as soon as the first data frame or a Physical Channel Reconfiguration Complete message is received from a new channel. This causes a break in the downlink transmission, which is proportional to handover signalling delays and round-trip delay between the user terminal (UE) and the MDC. In UMTS systems, a user plane data path change is triggered after the Layer-2 link establishment, e.g. after the Physical Channel Reconfiguration Complete message. Therefore the first downlink user data frame arrives at a user terminal typically later than it is capable to receive it.

Arrow 314 depicts the lost data on the downlink and arrow 320 depicts the lost data on the uplink.

In an embodiment of the present invention, the trigger to change a bi-directional or alternatively a downlink traffic channel is preferably a signalling message received by a user terminal or a base station (node B) before hard handover is established. In GSM systems, this message is typically either an Assignment Command, a Handover Command or a Proprietary Acknowledgement message for the previously mentioned messages. In 3G systems (such as UMTS), this message can be a Physical Channel Reconfiguration, a Radio Bearer Reconfiguration or a Transport Channel Reconfiguration message.

An embodiment of a hard handover method is described by means of FIG. 4. This embodiment is especially suitable for GSM-systems.

The embodiment starts in block 400. In block 402, messages indicating a bidirectional traffic channel change are exchanged between communication system units before hard handover. In block 404, the bidirectional traffic channel is changed before the detection of a communication system unit on a handover target channel.

The method ends in block 406.

The communication system unit detected on a handover target channel is typically a user terminal.

It is also possible that handover is not succeeded. Then, typically, the user terminal returns to the old channel or the call is terminated. If the user terminal returns to the old channel, it is possible to try again to carry out handover.

In the following, some embodiments are explained in further detail.

In one embodiment depicted in FIG. 5, the bidirectional switching of a traffic channel in the BSC 206 is carried out after a Handover Command, HO_command, (inter-cell handover) or an Assignment Command (intra-cell) message (not shown in FIG. 3) has been sent towards the BTS1 202; in other words, before the BTS2 204 has sent a handover detection (HO_Detect) message to the BSC 206.

Arrows 502, 504 show the last downlink data frame which is received by the user terminal on the old traffic channel. Arrows 506, 508 show when the last uplink data frame is transmitted on the old traffic channel.

Arrows 510, 512, show when the first downlink data frame is transmitted on the new traffic channel. Arrows 514, 516 show when the first uplink data frame is transmitted on the new traffic channel.

The benefit of this approach is that the switching of a downlink traffic channel is quite in phase with the user terminal (MS) 200 channel changeover because the user terminal starts to change the channel procedure just after the receipt of a Handover Command. This makes it possible to achieve the shortest possible interruption on the downlink. The transcoder TC 208, starts the downlink encoding with a new channel format after it has received a first uplink data frame from the BSC. Optionally, the bidirectional switching can be delayed in such a way that interruption times are equal in both transmission directions.

Arrow 500 depicts the lost data on the downlink and arrow 518 shows the lost data on the uplink. As can be seen by comparing FIGS. 2 and 5, the downlink data loss is smaller in the embodiment of FIG. 5.

In another embodiment depicted in FIG. 6, the bidirectional switching of a traffic channel is carried out in the BSC 206 after it has received a Handover Command Acknowledgement message, a HO_Command_Ack, (inter-cell HO) or Assignment Command Acknowledgement (intra-cell) (not shown in FIG. 3) message from the BTS1 202. In other words, before the BTS2 204 has sent a handover detection (HO_Detect) message to the BSC 206.

The benefit achieved by this embodiment is the cognisance that the user terminal (MS) 200 has left the old channel. Sometimes, for instance, if the channel has a high interference level in the air interface due to unsatisfactory radio frequency conditions, it might happen that the user terminal does not necessarily receive the first Handover Command message correctly and the BTS1 has to repeat the message until it is acknowledged by the RR (Receive Ready) message.

Arrows 602, 604 show the last downlink data frame which is received by the user terminal on the old traffic channel. Arrows 606, 608 show when the last uplink data frame is transmitted on the old traffic channel.

Arrows 610, 612, show when the first downlink data frame is transmitted on the new traffic channel. Arrows 614, 616 show when the first uplink data frame is transmitted on the new traffic channel.

Arrow 600 depicts the lost data on the downlink and arrow 618 depicts the lost data on the uplink. As can be seen by comparing FIGS. 2 and 6, the downlink data loss is smaller in the embodiment of FIG. 6.

Another embodiment of a hard handover method is described by means of FIG. 7. This embodiment is especially suitable for UMTS-systems.

The embodiment starts in block 700. In block 702, messages are exchanged before hard handover between communication system units indicate the traffic channel change. In block 704, a downlink traffic channel is changed. In block 706, a communication system unit is detected on a handover target channel. In block 708, an uplink traffic channel is changed. In block 710, a hard handover process is completed.

The method ends in block 712.

The communication system unit detected on a handover target channel is typically a user terminal.

It is also possible that handover is not succeeded. Then, typically, the user terminal returns to the old channel or the call is terminated. If the user terminal returns to the old channel, it is possible to try to perform handover again.

In one embodiment depicted in FIG. 8, an approach of separated downlink and uplink physical channel switching is presented. This approach enables to achieve minimum interruption times both in downlink (DL) and uplink (UL) directions, and it is feasible for hard handovers of 3G (for instance, UMTS systems Radio Access network, RAN). The downlink switching is typically done in UMTS systems in Layer-1 of the Radio Network Controller (RNC) 306, e.g. in MDC. MDC (macro diversity combining), is a Radio Network Controller (RNC) related user and control plane function that combines signals from a user terminal and chooses the best composition of quality parameters with the purpose of improving the quality of a call.

The downlink switching is carried out after the Radio Resource Control unit of the Serving Radio Network Controller (SRNC-RRC) 308 has sent a Physical Channel Reconfiguration message, the Physical Channel Reconfiguration in FIG. 8, which ensures that downlink user data is already available on a new channel after the user terminal has changed there to. Furthermore, it enables the minimum uplink interruption as the uplink physical channel is changed upon the reception of the first user data frame after L2 establishment on the new channel. The downlink switching is marked in FIG. 8 with a DL (downlink) switching block.

Arrow 800 shows when the last downlink data frame is received by the user terminal on the old traffic channel. Arrow 802 shows when the last uplink data frame is transmitted on the old traffic channel.

Arrow 806 shows when the first downlink data frame is transmitted on the new traffic channel. Arrow 808 shows when the first uplink data frame is transmitted on the new traffic channel.

The performance of the downlink switching can be improved if activation time procedure is used. If the activation time procedure is associated with the Physical Channel Reconfiguration (or equivalent) message, the channel changeover time of the user terminal during hard handover can be controlled by the RNC (Radio Network Controller). If the activation time is set appropriately and the same information is also forwarded to Layer-1 of the RNC, the downlink switching timing can be set in such a way that L1 of the RNC knows the connection frame number (CFN) of the old channel and the user terminal disconnects and starts a frequency transfer (tuning) to a new channel. Thereby the downlink switching can be done at an optimum time instant, and the user terminal is able to receive data from the target channel as soon as it has been tuned onto it. If the activation time is set to be far enough in the future, repetitions of the Physical Channel Reconfiguration (or equivalent) message in highly interfered radio conditions are possible before the channel changeover. A possible hard handover failure (i.e. the user terminal returns to an old channel) can be handled in such a way that L1 of the RNC switches back to the old channel if it receives data or signalling frames from the old channel.

The uplink switching is carried out after the Physical Channel Reconfiguration message or when the first data frame is received from the user terminal. Between the downlink switching and the uplink switching a radio link set-up request message (CPHY-RL-Set-up-REQ) is sent. The uplink switching is marked in FIG. 8 with a UL switching block.

The hard handover process is completed by a radio link release request SAP primitive (CPHY-RL-Release-REQ-message) sent by the Radio Resource Control unit of the Serving Radio Network Controller (SRNC-RRC).

Arrow 804 depicts the lost data on the downlink and arrow 810 depicts the lost data on the uplink. As can be seen by comparing FIGS. 3 and 8, the downlink data loss is smaller in the embodiment of FIG. 8.

In another embodiment depicted in FIG. 9, an approach of separated downlink bi-casting to old and new channels and uplink physical channel switching is presented. This approach enables minimum interruption times both in downlink and uplink directions. The downlink bi-casting in Layer-1 MDC of the RNC 306 is established after a new radio link has been added between Node B and the SRNC, or after the SRNC-RRC 308 has sent a Physical Channel Reconfiguration message, the Physical Channel Reconfiguration in FIG. 9.

Arrow 900 shows when the last downlink data frame is received by the user terminal on the old traffic channel. Arrow 902 shows when the last uplink data frame is transmitted on the old traffic channel.

This enables the user data to be available on a new channel after the user terminal has changed there to. Furthermore it enables the minimum uplink interruption time as the uplink physical channel is changed upon reception of the first user data frame after L2 establishment on the new channel. The downlink bi-casting on the physical channel contributes to that no data is lost if the Physical Channel Re-configuration message is repeated.

The uplink switching is carried out after the Physical Channel Reconfiguration message or when the first data frame is received from the user terminal. The uplink switching is marked in FIG. 9 with a UL switching block.

Arrow 906 shows when the first downlink data frame is transmitted on the new traffic channel. Arrow 908 shows when the first uplink data frame is transmitted on the new traffic channel.

The hard handover process is completed by a connection release from a dedicated physical channel radio link release request SAP primitive message (CPHY-RL-Release-REQ-message) sent by the Radio Resource Control unit of the Serving Radio Network Controller (SRNC-RRC).

Arrow 904 depicts the lost data on the downlink and arrow 910 depicts the lost data on the uplink. As can be seen by comparing FIGS. 3 and 9, the downlink data loss is smaller in the embodiment of FIG. 9.

Referring to FIG. 10, a simplified block diagram illustrates an example of the logical structure of a base station controller. The base station controller (BSC) is a part of a base station sub-system (BSS). The base station controller is in charge of all radio interface management through remote commands of the base station (BTS) and the user terminal. The main tasks of the base station controller include allocation and release of radio channels and handover management. The base station controller is typically connected to several base stations and to a Mobile Services Switching Centre (MSC).

Switching 1000 handles connections between a network subsystem (NSS) and the user terminal. The BSC is located between an A-interface 1002 and an A-bis interface 1014. In a remote transcoder concept, the BSC is located between an Ater-interface 1002 and the A-bis interface 1014. The BSC is connected to these interfaces via interface units 1004, 1012. Operation and management interface function 1008 serves as a medium for information transfer to and from the network management functions.

Radio resource management 1006 is a group of algorithms used to share and manage the radio path connection so that the quality and capacity of the connection are adequate. One of the most important radio resource management algorithms is handover control. Control functions 1010 handle of functions related to the set-up, maintenance and release of a radio connection between the base stations and user terminals.

Therefore, the hard handover methods described above are mainly carried out in the radio resource block 1006 and the control functions block 1010.

The disclosed functionalities of the preferred embodiments of the invention can be advantageously implemented by means of software in different parts of the data transmission system.

The precise implementation of the base station controller (BSC) is vendor-dependent.

Referring to FIG. 11, a simplified block diagram illustrates an example of the logical structure of a radio network controller (RNC). The RNC is the switching and controlling element of UTRAN. Switching 1100 handles connections between the core network and the user terminal. The radio network controller is located between Iub 1102 and Iu 1114 interfaces. The network controller is connected to these interfaces via interface units There is also an interface for inter-RNC transmission called Iur 1116. The functionality of the radio network controller can be classified into two categories: UTRAN radio resource management 1108 and control functions 1106. An operation and management interface function 1110 serves as a medium for information transfer to and from the network management functions. Radio resource management is a group of algorithms used to share and manage the radio path connection so that the quality and capacity of the connection are adequate. The most important radio resource management algorithms include handover control, power control, admission control, packet scheduling, and code management. The UTRAN control functions handle of functions related to the set-up, maintenance and release of a radio connection between the base stations and user terminals. Therefore, the hard handover methods described above are mainly carried out in the radio resource block 1108 and UTRAN control block 1106. The radio resource block 1108 and control functions block 1106 can be combined for performing a radio resource control (RRC) unit of a serving radio network controller (SRNC-RRC).

The precise implementation of the radio network controller (RNC) is vendor-dependent.

The disclosed functionalities of the preferred embodiments of the invention can be advantageously implemented by means of software in different parts of the data transmission system.

Even though the invention is described above with reference to an example according to the accompanying drawings, it is clear that the invention is not restricted thereto but it can be modified in various ways within the scope of the appended claims.

The invention claimed is:

1. A controller of a communication system, the controller comprising:
   a transceiver configured to exchange messages indicating bi-directional traffic channel change between other communication system units before hard handover;
   a first controller configured to change a bi-directional traffic channel before detection of a communication system unit on a handover target channel; and
   a second controller configured to carry out a bi-directional traffic channel change after at least one of an inter-cell handover command, and an intra-cell assignment command message has been sent to a base station to which a user terminal has a connection before the traffic channel change, wherein the second controller is operably connected to the transceiver.

2. The controller of claim 1, wherein the communication system unit detected on the handover target comprises a user terminal.

3. The controller of claim 1, wherein the first controller changes the bi-directional traffic channel to detect a user terminal.

4. A controller of a communication system, the controller comprising:
   a transceiver configured to exchange messages indicating traffic channel change between communication system units before hard handover;
   a first controller configured to change a downlink traffic channel;
   a detector configured to detect a communication system unit on a handover target channel;
   a second controller configured to change an uplink traffic channel at a different time than the changing of the downlink traffic channel; and
   a processor configured to complete a hard handover process, wherein the first controller, the detector, the second controller, and the processor are operably connected to the transceiver.

5. The controller of claim 4, wherein the processor is configured to complete the hard handover process by a radio link release request message, wherein the processor is operably connected to the transceiver.

6. The controller of claim 4, wherein the first controller is further configured to carry out the downlink channel change after sending a physical channel reconfiguration message, and the second controller is further configured to carry out the.

* * * * *